United States Patent
Kitaji et al.

(10) Patent No.: US 9,812,932 B2
(45) Date of Patent: Nov. 7, 2017

(54) MOTOR

(71) Applicant: Nidec Corporation, Kyoto (JP)

(72) Inventors: Kazuya Kitaji, Kyoto (JP); Jun Nagasawa, Kyoto (JP); Keizo Furukawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 207 days.

(21) Appl. No.: 14/690,622

(22) Filed: Apr. 20, 2015

(65) Prior Publication Data
US 2015/0381017 A1 Dec. 31, 2015

(30) Foreign Application Priority Data
Jun. 26, 2014 (JP) .................. 2014-131330

(51) Int. Cl.
| | | |
|---|---|---|
| *H02K 11/00* | (2016.01) | |
| *H02K 1/16* | (2006.01) | |
| *H02K 1/30* | (2006.01) | |
| *H02K 1/27* | (2006.01) | |
| *H02K 29/08* | (2006.01) | |

(52) U.S. Cl.
CPC .......... *H02K 11/0021* (2013.01); *H02K 1/16* (2013.01); *H02K 1/2733* (2013.01); *H02K 1/30* (2013.01); *H02K 29/08* (2013.01)

(58) Field of Classification Search
CPC .... H02K 1/2733; H02K 11/0021; H02K 1/16; H02K 1/30; H02K 11/215; H02K 1/28; H02K 29/08
USPC ............................................. 310/68 B, 261.1
See application file for complete search history.

(56) References Cited

U.S. PATENT DOCUMENTS

| | | | | |
|---|---|---|---|---|
| 6,784,586 B2* | 8/2004 | Akemakou | .......... | H02K 11/048 310/181 |
| 2005/0225190 A1* | 10/2005 | Kinashi | ................ | H02K 1/2733 310/156.13 |
| 2006/0158053 A1 | 7/2006 | Aschoff et al. | | |
| 2007/0278060 A1* | 12/2007 | Kennedy | ................. | F16D 37/02 192/3.33 |

(Continued)

FOREIGN PATENT DOCUMENTS

| | | | |
|---|---|---|---|
| CN | 201113714 Y | * | 9/2008 |
| DE | 9303414 U1 | | 7/1994 |

(Continued)

OTHER PUBLICATIONS

Derwent Abstract of CN 201113714 Y (Year: 2008).*
Translation of foreign document CN 201113714 Y (Year: 2008).*

*Primary Examiner* — Alex W Mok
(74) *Attorney, Agent, or Firm* — Keating & Bennett, LLP (57) ABSTRACT

A motor includes a rotating portion including a shaft and a rotor, and a stationary portion including a stator and a magnetic sensor. The magnetic sensor is located above the rotor to detect the rotational position of the rotor. The rotor includes a tubular rotor core defined by laminated steel sheets; a rotor magnet including an upper end surface at an axial level higher than an axial level of an upper end surface of the rotor core; and a rotor holder including a ferromagnetic body, and above the rotor core and radially inside of the rotor magnet. Each of the rotor core and an outer cylindrical portion of the rotor holder is in contact with the rotor magnet or opposite to the rotor magnet with a gap intervening therebetween.

2 Claims, 7 Drawing Sheets

(56) References Cited

U.S. PATENT DOCUMENTS

| | | | | |
|---|---|---|---|---|
| 2012/0043862 | A1* | 2/2012 | Furukawa | H02K 1/278 310/68 B |
| 2014/0028121 | A1* | 1/2014 | Bekavac | H02K 1/27 310/50 |

FOREIGN PATENT DOCUMENTS

| | | | |
|---|---|---|---|
| JP | 06-261514 A | 9/1994 | |
| JP | 2006-333669 A | 12/2006 | |
| JP | 2010-148191 A | 7/2010 | |
| JP | EP 2546959 A1 * | 1/2013 | H02K 1/2733 |
| JP | 2013-099094 A | 5/2013 | |
| JP | 2013-115980 A | 6/2013 | |
| JP | 2014-007802 A | 1/2014 | |

* cited by examiner

MOTOR

BACKGROUND OF THE INVENTION

1. Field of the Invention

The present invention relates to a motor.

2. Description of the Related Art

In a so-called inner-rotor motor, in which a rotating shaft and a rotor magnet are arranged radially inside of an armature, a bending of the shaft tends to occur more easily with an increasing rotational speed of the motor. A bending of the shaft may cause vibrations and noise of the motor as a whole. In recent years, due to an increase in the rotational speed of motors, there has been a demand for preventing a bending of the shaft. A known inner-rotor motor is described, for example, in JP-A 2013-99094.

In the motor described in JP-A 2013-99094, a shaft and a rotor magnet are fixed to each other through a sleeve and a rotor yoke (see paragraph [0019] and FIG. 1 of JP-A 2013-99094). Each of the sleeve and the rotor yoke is fixed to the shaft at one axial position. With this structure, it is difficult to improve rigidity of the shaft and its vicinity, and it is also difficult to prevent a bending of the shaft while the motor is running.

An effective way to prevent a bending of the shaft is to arrange a rotor core around the shaft.

In the motor described in JP-A 2013-99094, the rotor magnet is arranged to project toward a circuit board relative to a stator core (see FIG. 1 of JP-A 2013-99094). In the case where the circuit board has mounted thereon magnetic sensors used to detect the circumferential position of the rotor magnet, it is necessary to ensure that the magnetic sensors are able to detect the circumferential position of the rotor magnet with sufficient precision. This requires some a special configuration to be used, such as reducing the distance between the circuit board and the rotor magnet as in the motor described in JP-A 2013-99094.

However, extending the rotor core up to an end portion of the rotor magnet on a side closer to the circuit board, which would not contribute to improving a torque characteristic of the motor, would result in an undesirable increased weight of the motor, resulting in a deterioration in the torque characteristic of the motor.

SUMMARY OF THE INVENTION

A motor according to a preferred embodiment of the present invention includes a stationary portion and a rotating portion configured to rotate about a rotation axis extending in a vertical direction. The rotating portion includes a shaft extending along the rotation axis, and a rotor configured to rotate together with the shaft. The stationary portion includes a stator located radially outside of the rotor, and a magnetic sensor arranged above the rotor to detect a rotational position of the rotor. The rotor includes a tubular rotor core which is a ferromagnetic body and fixed to the shaft; a rotor magnet located radially outside of the rotor core and under the magnetic sensor, in contact with the rotor core or located opposite to the rotor core with a first gap intervening therebetween, and including an upper end surface positioned at an axial level higher than an axial level of an upper end surface of the rotor core; and at least one rotor holder that is a ferromagnetic body, and located above the rotor core and radially inside of the rotor magnet. The rotor core is defined by laminated steel sheets placed one upon another in an axial direction. The rotor holder includes an outer cylindrical portion in contact with the rotor magnet or located opposite to the rotor magnet with a second gap intervening therebetween.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a rotation axis of a motor is referred to by term "axial direction", "axial", or "axially", that directions perpendicular or substantially perpendicular to the rotation axis of the motor are referred to by the term "radial direction", "radial", or "radially", and that a direction along a circular arc centered on the rotation axis of the motor is referred to by the term "circumferential direction", "circumferential", or "circumferentially". It is also assumed herein that an axial direction is a vertical direction, and that a side on which a magnetic sensor is located with respect to a rotor is defined as an upper side. The shape of each member or portion and relative positions of different members or portions will be described based on the above assumptions. It should be noted, however, that the above definitions of the vertical direction and the upper and lower sides are made simply for the sake of convenience in description, and should not be construed to restrict in any way the orientation of a motor according to any preferred embodiment of the present invention when in use.

Figure 1:
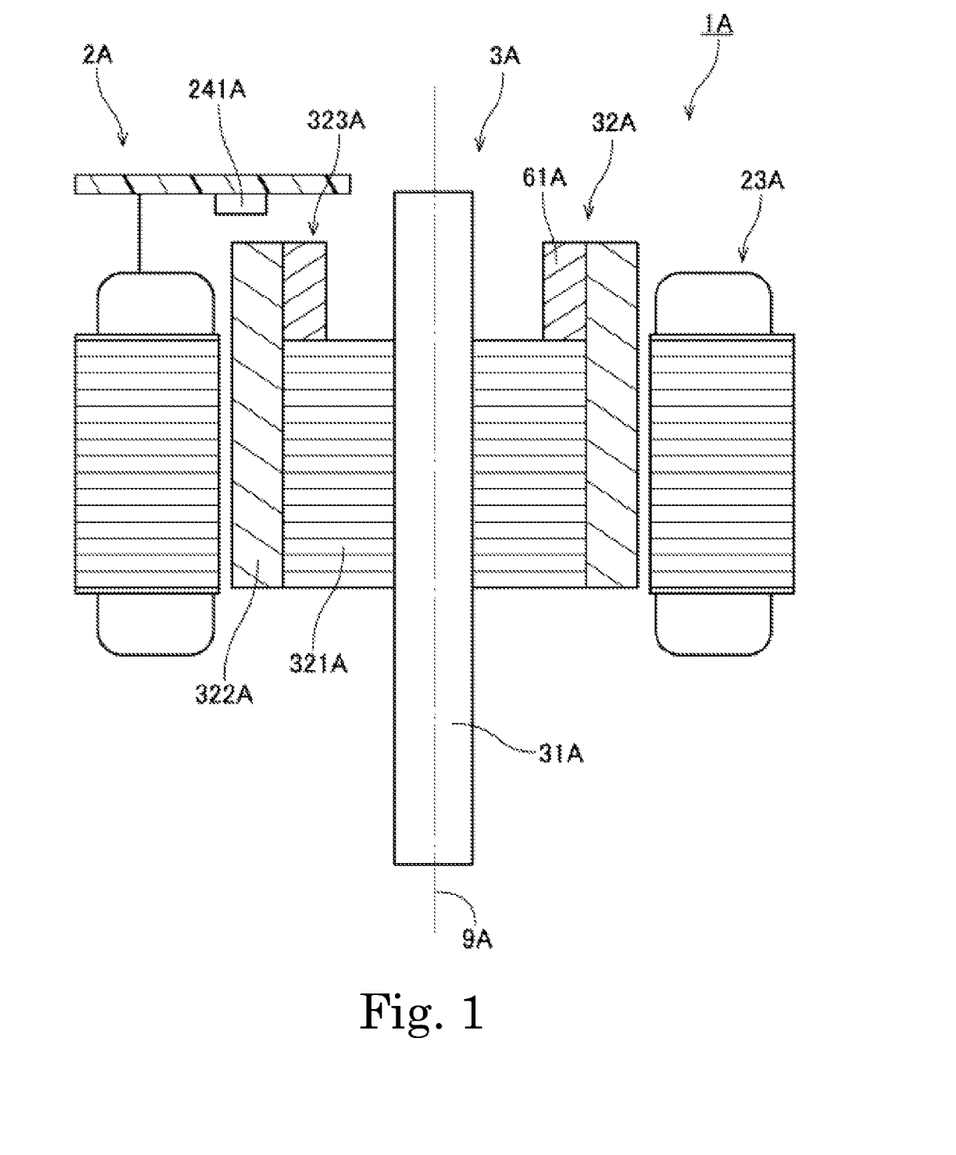
FIG. 1 is a cross-sectional view of a motor according to a first preferred embodiment of the present invention.

First, a motor 1A according to a preferred embodiment of the present invention will be described below with reference to FIG. 1. FIG. 1 is a cross-sectional view of the motor 1A. As illustrated in FIG. 1, the motor 1A includes a stationary portion 2A and a rotating portion 3A.

The stationary portion 2A preferably includes a stator 23A and magnetic sensors 241A. The stator 23A is an armature located radially outside of a rotor 32A of the rotating portion 3A. The rotor 32A will be described below. The magnetic sensors 241A are located above the rotor 32A described below to detect the rotational position of the rotor 32A.

Specifically, the magnetic sensors 241A are arranged over a rotor magnet 322A described below. The magnetic sensors 241A are configured to detect the circumferential position of the rotor magnet 322A by detecting magnetic flux passing from the rotor magnet 322A toward each magnetic sensor 241A.

The rotating portion 3A is supported to be rotatable about a rotation axis 9A with respect to the stationary portion 2A. The rotating portion 3A is thus configured to rotate about the rotation axis 9A. The rotating portion 3A preferably includes a shaft 31A and the rotor 32A.

The shaft 31A is a columnar member extending along the rotation axis 9A. The rotor 32A is configured to rotate together with the shaft 31A. The rotor 32A preferably includes a rotor core 321A, the rotor magnet 322A, and a rotor holder 323A.

The rotor core 321A is a tubular member that is a ferromagnetic body fixed to the shaft 31A. Specifically, the rotor core 321A is preferably defined by laminated steel sheets, i.e., a plurality of steel sheets placed one upon another in the axial direction. The rotor core 321A is positioned around the shaft 31A to increase rigidity of the rotor 32A including the shaft 31A. This contributes to preventing a bending of the shaft 31A while the motor 1A is running. This in turn contributes to reducing vibrations and noise of the motor 1A.

The rotor magnet 322A is an annular magnet. An outer circumferential surface of the rotor magnet 322A is located radially opposite to an inner circumferential surface of the stator core 231A. The outer circumferential surface of the rotor magnet 322A includes north and south poles arranged to alternate with each other in a circumferential direction. Note that a plurality of magnets may be used in place of the rotor magnet 322A. The rotor magnet 322A is positioned under the magnetic sensors 241A.

The rotor magnet 322A is located radially outside of the rotor core 321A. According to the present preferred embodiment, the rotor magnet 322A and the rotor core 321A are preferably in contact with each other. That is, a radial distance from the rotation axis 9A to an inner circumferential surface of the rotor magnet 322A and a radial distance from the rotation axis 9A to an outer circumferential surface of the rotor core 321A are preferably equal or substantially equal to each other.

In the case where the rotor magnet 322A and the rotor core 321A are radially opposite to each other with a gap intervening therebetween, this gap is referred to as a first gap. In this case, the first gap is narrow enough to allow the rotor core 321A to define and function as a back yoke for the rotor magnet 322A.

An upper end surface of the rotor magnet 322A is positioned at an axial level higher than an axial level of an upper end surface of the rotor core 321A. Thus, the axial distance between the rotor magnet 322A and each magnetic sensor 241A is reduced. This enables the magnetic sensors 241A to detect the circumferential position of the rotor magnet 322A with higher precision.

The rotor holder 323A is located above the rotor core 321A and radially inside of the rotor magnet 322A. The rotor holder 323A is a ferromagnetic body. Moreover, the rotor holder 323A preferably includes a cylindrical or substantially cylindrical outer cylindrical portion 61A extending along the rotation axis 9A. The outer cylindrical portion 61A may be either in contact with the rotor magnet 322A or located radially opposite to the rotor magnet 322A with a gap intervening therebetween. In the case where the outer cylindrical portion 61A and the rotor magnet 322A are located opposite to each other with the gap intervening therebetween, this gap is referred to as a second gap. In this case, the second gap is narrow enough to allow the outer cylindrical portion 61A to define and function as a back yoke for the rotor magnet 322A.

Thus, above the rotor core 321A, the rotor holder 323A defines and functions as the back yoke for the rotor magnet 322A. Consequently, even in the case where the rotor magnet 322A projects upward above the upper end surface of the rotor core 321A, magnetic flux is reduced only to a limited degree at a projecting portion of the rotor magnet 322A. Accordingly, a reduction in the magnetic flux passing from the rotor magnet 322A toward each magnetic sensor 241A is reduced or eliminated. This contributes to further improving the precision with which the circumferential position of the rotor magnet 322A is detected by the magnetic sensors 241A.

Moreover, since the rotor holder 323A defines and functions as the back yoke, it is not necessary to extend the rotor core 321A up to a vicinity of an upper end portion of the rotor magnet 322A. This reduces an increase in the weight of the motor 1A due to the weight of the rotor core 321A. As described above, the motor 1A according to the present preferred embodiment is able to reduce the possibility of a bending of the shaft 31A, and also to achieve improved precision with which the circumferential position of the rotor magnet 322A is detected by the magnetic sensors 241A while reducing an increase in the weight of the motor 1A.

Figure 2:
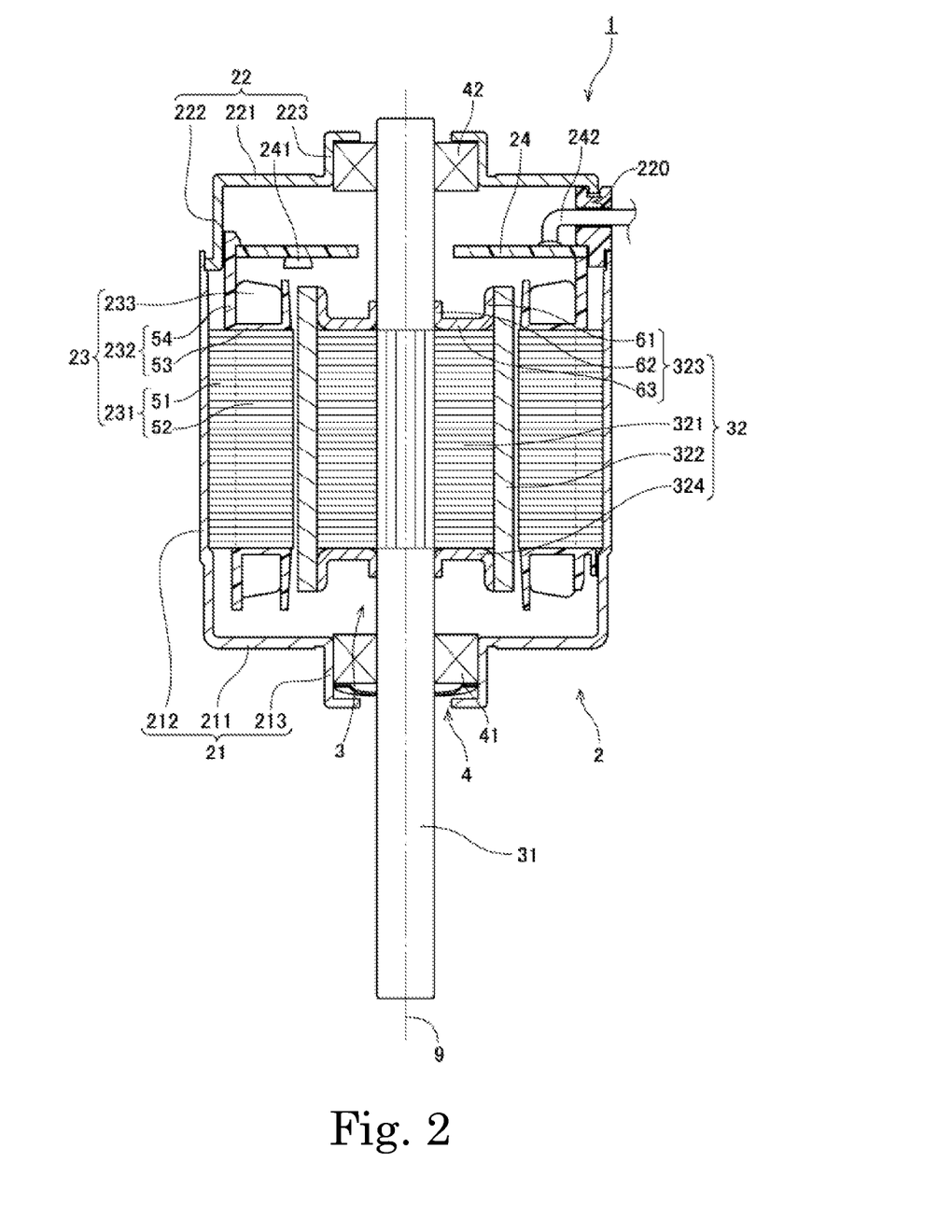
FIG. 2 is a cross-sectional view of a motor according to a second preferred embodiment of the present invention.
Figure 3:
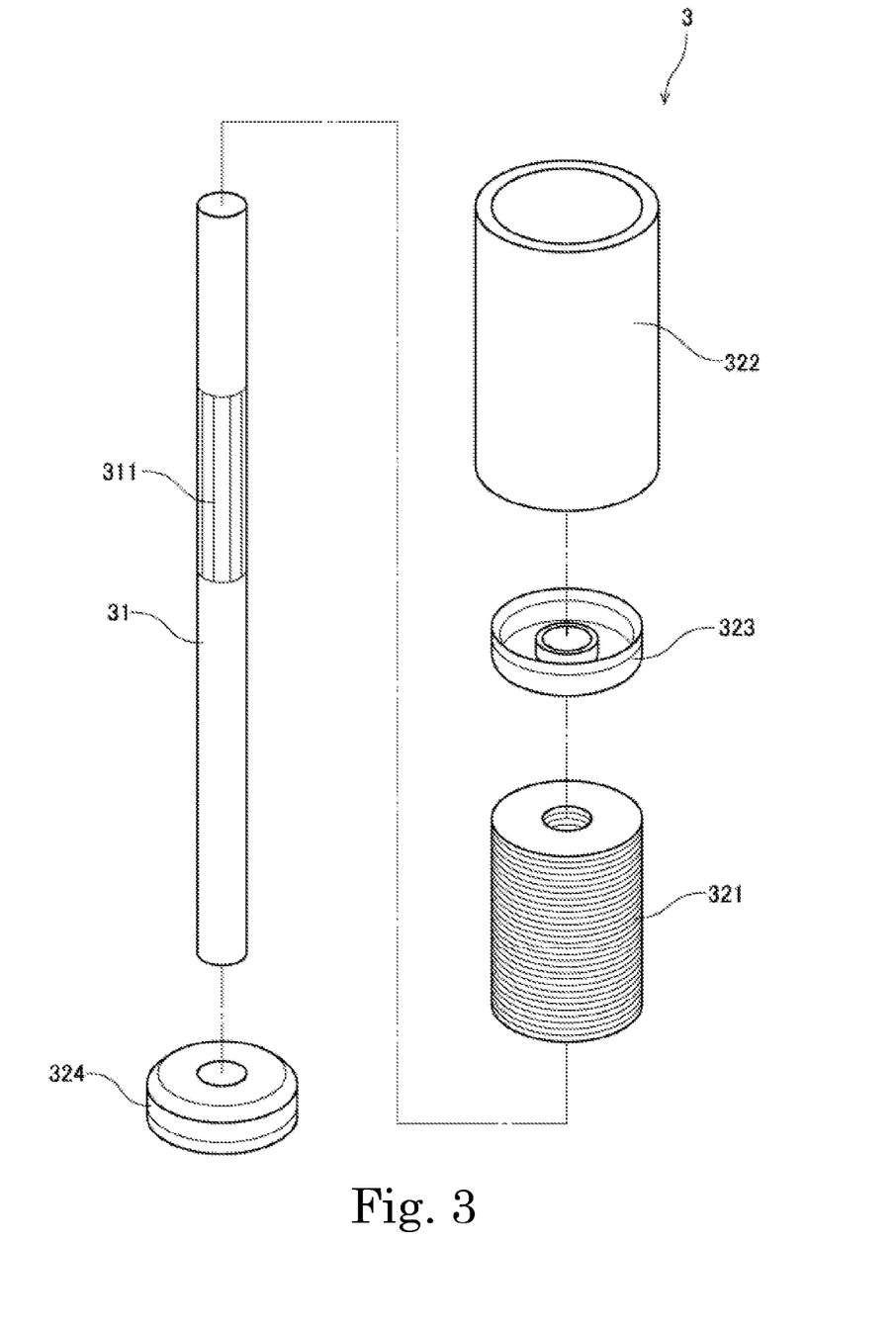
FIG. 3 is an exploded perspective view of a rotating portion according to the second preferred embodiment of the present invention.
Figure 4:
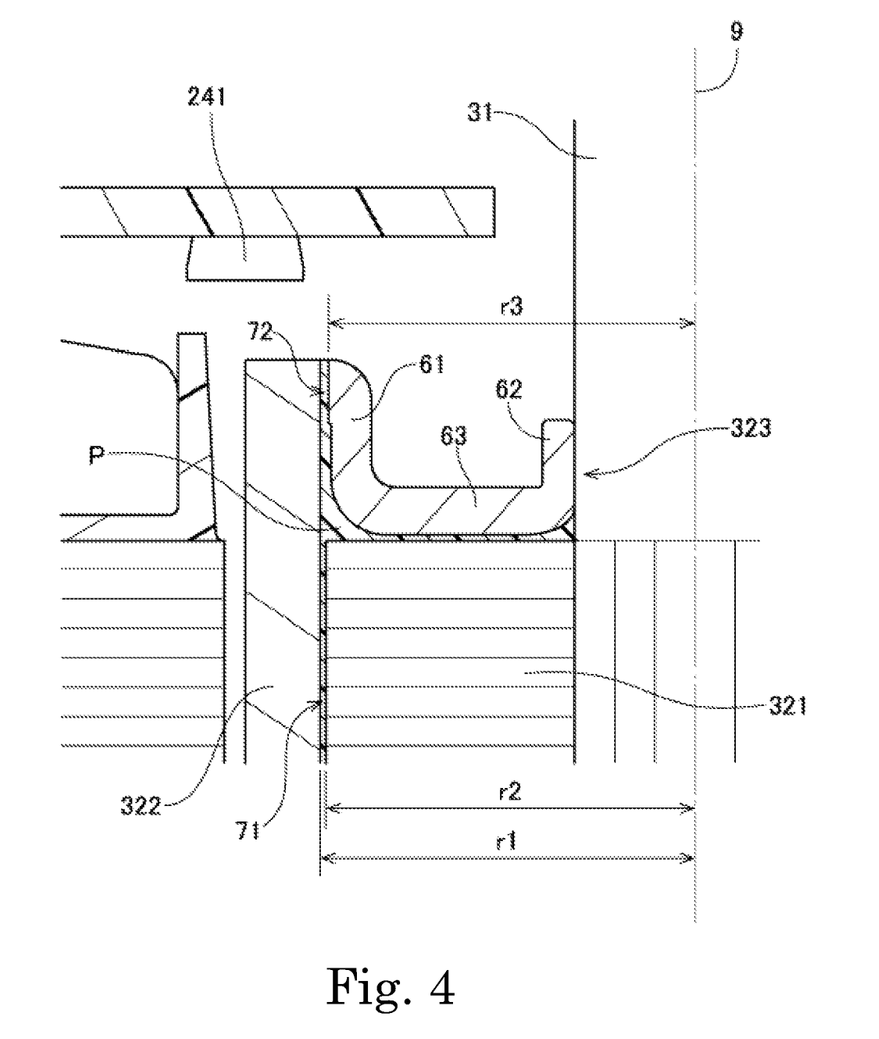
FIG. 4 is a partial cross-sectional view of the motor according to the second preferred embodiment of the present invention.

Next, a motor 1 according to another preferred embodiment of the present invention will now be described below with reference to FIGS. 2, 3, and 4. FIG. 2 is a cross-sectional view of the motor 1. FIG. 3 is an exploded perspective view of a rotating portion 3 of the motor 1. FIG. 4 is a partial cross-sectional view of the motor 1. The motor 1 is preferably used, for example, in a blower to provide rotational power to rotate an impeller of the blower.

As illustrated in FIG. 2, the motor 1 according to the present preferred embodiment includes a stationary portion 2, the rotating portion 3, and a bearing portion 4.

The stationary portion 2 according to the present preferred embodiment preferably includes a housing 21, a cap 22, a stator 23, and a circuit board 24.

The housing 21 preferably includes a housing bottom portion 211, a housing tubular portion 212, and a first bearing holding portion 213. The housing bottom portion 211 is preferably perpendicular or substantially perpendicular to a rotation axis 9. The housing tubular portion 212 is tubular, and extends axially upward from the housing bottom portion 211 along the rotation axis 9. The first bearing holding portion 213 projects downward from the housing bottom portion 211. An outer circumferential surface of a lower ball bearing 41, which will be described below, of the bearing portion 4 is fixed inside the first bearing holding portion 213.

The cap 22 preferably includes a cap bottom portion 221, a cap tubular portion 222, and a second bearing holding portion 223. The cap bottom portion 221 is perpendicular or substantially perpendicular to the rotation axis 9. The cap tubular portion 222 is preferably tubular, and extends axially downward from the cap bottom portion 221 along the rotation axis 9. The second bearing holding portion 223 projects upward from the cap bottom portion 221. An outer circumferential surface of an upper ball bearing 42, which will be described below, of the bearing portion 4 is fixed inside the second bearing holding portion 223.

The stator 23, at least a portion of the circuit board 24, and a rotor 32 of the rotating portion 3 are accommodated inside a case defined by the housing 21 and the cap 22. The rotor 32 will be described below. Each of the housing 21 and the cap 22 is preferably made of, for example, a galvanized steel sheet, SUS, or the like. The housing 21 and the cap 22 according to the present preferred embodiment are preferably made of the same material. Note that the housing 21 and the cap 22 may be made of different materials.

The stator 23 is preferably an armature defined by a stator core 231, an insulator 232, and coils 233. The stator 23 is located radially outside of the rotor 32.

The stator core 231 is preferably defined by electromagnetic steel sheets placed one upon another in an axial direction. The stator core 231 includes an annular core back 51 and a plurality of teeth 52 which project radially inward from the core back 51. An outer circumferential surface of the core back 51 is fixed to an inner circumferential surface of the housing tubular portion 212. The plurality of teeth 52 are preferably positioned at regular or substantially regular intervals in a circumferential direction.

The insulator 232 is preferably a member made of, for example, a resin and arranged to cover a portion of a surface of the stator core 231. The insulator 232 according to the present preferred embodiment includes a cover portion 53 configured to cover an upper end surface of the stator core 231, and a board support portion 54 which projects upward from the cover portion 53.

Each of the coils 233 is wound around a separate one of the teeth 52 with the insulator 232 intervening therebetween. Each coil 233 is defined by a conducting wire wound around a corresponding one of the teeth 52 with the insulator 232 intervening therebetween.

The circuit board 24 is configured to supply electric drive currents to the coils 233 of the stator 23. The circuit board 24 according to the present preferred embodiment is provided in a space enclosed by the housing 21 and the cap 22. The circuit board 24 is fixed to the board support portion 54 of the insulator 232.

Magnetic sensors 241 located above the rotor 32 to detect the rotational position of the rotor 32 are preferably located on a lower surface of the circuit board 24. The magnetic sensors 241 detect the rotational position of the rotor 32 by detecting the circumferential position of a rotor magnet 322 described below. Each magnetic sensor 241 is preferably, for example, a Hall element.

According to the present preferred embodiment, the number of magnetic sensors 241 is preferably three, and the three magnetic sensors 241 are preferably spaced from one another by sixty degrees about the rotation axis 9, for example. Thus, the magnetic sensors 241 detect the circumferential position of the rotor magnet 322, and perform feedback to enable appropriate drive control of the motor 1. To accurately detect the circumferential position of the rotor magnet 322, it is desirable that the axial distance between an upper end surface of the rotor magnet 322 and each magnetic sensor 241 be as short as possible.

The cap tubular portion 222 of the cap 22 according to the present preferred embodiment preferably includes a cutout 220 passing through the cap tubular portion 222 in a radial direction. A portion of a lead wire 242 connected to the circuit board 24 is preferably arranged within the cutout 220. Note that a portion of the circuit board 24 or a connector may also be arranged in the cutout 220 if so desired. Also note that the cap 22 may include a hole passing through the cap tubular portion 222 in a radial direction in place of the cutout 220. Thus, the circuit board 24 is electrically connected to an external device through the cutout 220 to enable electric drive currents necessary to drive the motor 1 to be supplied to the circuit board 24.

The rotating portion 3 is supported to be rotatable about the rotation axis 9 with respect to the stationary portion 2. The rotating portion 3 according to the present preferred embodiment includes a shaft 31 and the rotor 32.

As illustrated in FIGS. 2 and 3, the shaft 31 is a columnar member extending along the rotation axis 9. A metal, such as, for example, stainless steel, is preferably used as a material of the shaft 31. The shaft 31 is configured to rotate about the rotation axis 9 while being supported by the bearing portion 4. A lower end portion of the shaft 31 projects downward below the housing 21. The lower end portion of the shaft 31 is preferably fixed to an object which is to be driven by the motor 1, such as, for example, the impeller of the blower.

An outer circumferential surface of the shaft 31 includes a press fit portion 311 to which a rotor core 321 described below is press fitted. The press fit portion 311 is preferably, for example, knurled to fix the rotor core 321 thereto with increased strength. The press fit portion 311 is knurled in a linear pattern with straight ridges extending along the rotation axis 9 according to the present preferred embodiment, but may alternatively be knurled in a crisscross pattern, e.g., a diamond pattern or a square or rectangular pattern, or in a diagonal pattern. Also note that knurling may not necessarily be applied to the shaft 31.

As illustrated in FIG. 2, the rotor 32 preferably includes the rotor core 321, the rotor magnet 322, a first rotor holder 323, and a second rotor holder 324. The rotor 32 is configured to rotate together with the shaft 31.

As illustrated in FIGS. 2 and 3, the rotor core 321 is cylindrical and is defined by electromagnetic steel sheets placed one upon another in the axial direction. That is, the rotor core 321 is a ferromagnetic body. An inner circumferential surface of the rotor core 321 is fixed to the shaft 31 through press fitting. The rotor core 321 is positioned around the shaft 31 to increase rigidity of the shaft 31. This contributes to preventing a bending of the shaft 31 while the motor 1 is running. This in turn contributes to reducing and preventing vibrations and noise of the motor 1.

According to the present preferred embodiment, the stator core 231 has an axial dimension equal or substantially equal to the axial dimension of the rotor core 321. Accordingly, the steel sheets which define the stator core 231 and the steel sheets which define the rotor core 321 can preferably be stamped from the same steel sheet. Specifically, the steel sheets of the rotor core 321 are stamped out from portions of the steel sheet which are radially inside of portions of the steel sheet from which the steel sheets of the stator core 231 are stamped out. Thus, material costs of the stator core 231 and the rotor core 321 are reduced, and scraps are also reduced.

The rotor magnet 322 is an annular magnet centered on the rotation axis 9. The rotor magnet 322 is located radially outside of the rotor core 321 and under the magnetic sensors 241, and is configured to rotate together with the shaft 31.

An outer circumferential surface of the rotor magnet 322 is located radially opposite to an inner end of each of the plurality of teeth 52 of the stator core 231. In addition, the outer circumferential surface of the rotor magnet 322 includes north and south poles arranged to alternate with each other in the circumferential direction. Note that, in place of the annular rotor magnet 322, a plurality of magnets may be used. In this case, the plurality of magnets are arranged in the circumferential direction such that north and south pole surfaces alternate with each other.

As illustrated in FIG. 4, an inner circumferential surface of the rotor magnet 322 is located radially opposite to the rotor core 321 with a first gap 71 intervening therebetween. The first gap 71 is narrow enough to allow the rotor core 321 to define and function as a back yoke for the rotor magnet 322. This contributes to increasing magnetic flux which passes from the rotor magnet 322 toward the stator core 231 at a position opposed to the stator core 231. Thus, a torque characteristic of the motor 1 is improved.

According to the present preferred embodiment, an outer circumferential surface of the rotor core 321 and the inner circumferential surface of the rotor magnet 322 are preferably fixed to each other through, for example, adhesion. Thus, an adhesive P is arranged in the first gap 71.

The upper end surface of the rotor magnet 322 is positioned at an axial level higher than an axial level of an upper end surface of the rotor core 321. Thus, the axial distance between the rotor magnet 322 and each magnetic sensor 241 is preferably reduced. This enables the magnetic sensors 241 to detect the circumferential position of the rotor magnet 322 with higher precision.

In addition, according to the present preferred embodiment, a lower end surface of the rotor magnet 322 is positioned at an axial level lower than an axial level of a lower end surface of the rotor core 321. Moreover, the axial dimension of a portion of the rotor magnet 322 which is above the upper end surface of the rotor core 321 is preferably equal or substantially equal to the axial dimension of a portion of the rotor magnet 322 which is below the lower end surface of the rotor core 321. Accordingly, magnetic flux originating from the rotor magnet 322 is distributed in a balanced manner above and below an axial middle of the stator 23.

Each of the first rotor holder 323 and the second rotor holder 324 is preferably made of a ferromagnetic material, such as, for example, steel. Each of the first rotor holder 323 and the second rotor holder 324 according to the present preferred embodiment is preferably a stamping, i.e., an article obtained by subjecting a sheet material to press working. Thus, a production cost of each of the first rotor holder 323 and the second rotor holder 324 is reduced compared to the case where each of the first rotor holder 323 and the second rotor holder 324 is manufactured by another method, such as, for example, laminating steel sheets.

The first rotor holder 323 is located above the rotor core 321. The second rotor holder 324 is located below the rotor core 321. In addition, each of the first rotor holder 323 and the second rotor holder 324 is preferably located radially inside of the rotor magnet 322. The second rotor holder 324 preferably has the same or substantially the same shape as that of the first rotor holder 323, and the first and second rotor holders 323 and 324 are arranged upside down relative to each other. That is, the first rotor holder 323 and the second rotor holder 324 are preferably symmetric or substantially symmetric with respect to a horizontal plane. Thus, the magnetic flux originating from the rotor magnet 322 is distributed in a more balanced manner above and below the axial middle of the stator 23. The second rotor holder 324 is similar to the first rotor holder 323 in the shape, dimensions, and so on, and descriptions thereof are therefore omitted.

The first rotor holder 323 preferably includes an outer cylindrical portion 61, an inner cylindrical portion 62, and an annular plate portion 63. Each of the outer cylindrical portion 61 and the inner cylindrical portion 62 is a cylindrical or substantially cylindrical portion extending along the rotation axis 9. The outer cylindrical portion 61 extends along the inner circumferential surface of the rotor magnet 322.

In addition, as illustrated in FIG. 4, the outer cylindrical portion 61 according to the present preferred embodiment is preferably located radially opposite to the inner circumferential surface of the rotor magnet 322 with a second gap 72 intervening therebetween. The second gap 72 is narrow enough to allow the outer cylindrical portion 61 to function as a back yoke for the rotor magnet 322. According to the present preferred embodiment, the inner circumferential surface of the rotor magnet 322 and an outer circumferential surface of the first rotor holder 323 are preferably fixed to each other through adhesion. Therefore, the adhesive P is arranged in the second gap 72.

Thus, above the rotor core 321, the first rotor holder 323 defines and functions as the back yoke for the rotor magnet 322. Consequently, even in the case where the rotor magnet 322 projects upward above the upper end surface of the rotor core 321, magnetic flux is reduced only to a limited degree at a projecting portion of the rotor magnet 322. Accordingly, a reduction in the magnetic flux passing from the rotor magnet 322 toward each magnetic sensor 241 is reduced. This contributes to further improving the precision with which the circumferential position of the rotor magnet 322 is detected by the magnetic sensors 241.

Here, the radial width of the first gap 71 corresponds to a difference between a radial distance r1 from the rotation axis 9 to the inner circumferential surface of the rotor magnet 322 and a radial distance r2 from the rotation axis 9 to the outer circumferential surface of the rotor core 321. Meanwhile, the radial width of the second gap 72 corresponds to a difference between the radial distance r1 from the rotation axis 9 to the inner circumferential surface of the rotor magnet 322 and a radial distance r3 from the rotation axis 9 to the outer circumferential surface of the first rotor holder 323.

According to the present preferred embodiment, the radial distance r3 from the rotation axis 9 to the outer circumferential surface of the first rotor holder 323 is equal to or smaller than the radial distance r2 from the rotation axis 9 to the outer circumferential surface of the rotor core 321. That is, the radial width of the first gap 71 is smaller than the radial width of the second gap 72.

As described above, the rotor core 321 is preferably defined by laminating the stamped electromagnetic steel sheets in the axial direction. Meanwhile, the first rotor holder 323 is preferably molded by press working. Therefore, a radial dimensional accuracy of the rotor core 321 is higher than a radial dimensional accuracy of the first rotor holder 323. Accordingly, the radial width of the first gap 71 is preferably smaller than the radial width of the second gap 72 to increase accuracy with which the rotor magnet 322 is positioned with respect to the rotation axis 9. As a result, the rotor magnet 322 is more easily arranged to be coaxial with the rotation axis 9.

In addition, since the radial width of the first gap 71 is smaller than the radial width of the second gap 72, the rotor core 321 defines and functions as the back yoke for the rotor magnet 322 more effectively than the first rotor holder 323. This contributes to further increasing magnetic flux which passes from the rotor magnet 322 toward the stator core 231 at the position opposed to the stator core 231. As a result, the torque characteristic of the motor 1 is further improved.

According to the present preferred embodiment, the axial position of the upper end surface of the rotor magnet 322 and the axial position of an upper end surface of the outer cylindrical portion 61 of the first rotor holder 323 are identical or substantially identical to each other. That is, the axial position of the upper end surface of the rotor magnet 322 and the axial position of an upper end surface of a portion of the first rotor holder 323 which is adjacent to the rotor magnet 322 are identical or substantially identical to each other. This contributes to further increasing magnetic flux passing from a vicinity of an upper end portion of the rotor magnet 322 toward each magnetic sensor 241. This enables the magnetic sensors 241 to detect the circumferential position of the rotor magnet 322 with still higher precision.

The annular plate portion 63 is a portion which joins a lower end portion of the outer cylindrical portion 61 and a lower end portion of the inner cylindrical portion 62 to each other. According to the present preferred embodiment, a gap is preferably defined between a lower end surface of the first rotor holder 323, that is, a lower end surface of the annular plate portion 63, and the upper end surface of the rotor core 321. Thus, the rotor core 321 and the first rotor holder 323 do not restrict the axial position of each other. Accordingly, a variation in the axial dimension of the rotor core 321 or of the first rotor holder 323 would preferably not prevent the rotor core 321 and the first rotor holder 323 from being positioned at their respective appropriate axial positions. This allows, for example, the position of an axial middle of the rotor core 321, the position of an axial middle of the rotor magnet 322, and the position of an axial midpoint between the first rotor holder 323 and the second rotor holder 324 to coincide with one another.

The inner cylindrical portion 62 is fixed to the shaft 31. The first rotor holder 323 is fixed to the shaft 31 as a result of an inner circumferential surface of the inner cylindrical portion 62 of the first rotor holder 323 being, for example, press fitted to the outer circumferential surface of the shaft 31. Thus, a radially inner end portion of the first rotor holder 323 is in contact with the outer circumferential surface of the shaft 31. This makes it easy to arrange the shaft 31 and the first rotor holder 323 to be coaxial with each other. Note that the second rotor holder 324 is also fixed to the shaft 31 through press fitting in a manner similar to that in which the first rotor holder 323 is fixed to the shaft 31.

In addition, since the first rotor holder 323 is molded by press working, a tapered portion which becomes radially more distant from the rotor magnet 322 with decreasing distance from an axial end portion thereof is defined at a junction of the annular plate portion 63 and the outer cylindrical portion 61. Therefore, if the annular plate portion 63 were joined to an upper end portion of the outer cylindrical portion 61, the radial width of the second gap 72 would increase at a position radially inside the upper end portion of the rotor magnet 322. This would make the function of the first rotor holder 323 as the back yoke for the vicinity of the upper end portion of the rotor magnet 322 less effective.

According to the present preferred embodiment, the annular plate portion 63 is preferably joined to the lower end portion of the outer cylindrical portion 61 to allow the radial distance between the outer cylindrical portion 61 and the rotor magnet 322 to be uniform or substantially uniform in the vicinity of the upper end portion of the outer cylindrical portion 61. This contributes to preventing the function of the first rotor holder 323 as the back yoke for the vicinity of the upper end portion of the rotor magnet 322 from becoming less effective. This in turn contributes to preventing a reduction in the precision with which the circumferential position of the rotor magnet 322 is detected by the magnetic sensors 241.

The bearing portion 4 includes the lower ball bearing 41 and the upper ball bearing 42. As described above, the outer circumferential surfaces of the lower ball bearing 41 and the upper ball bearing 42 are fixed to the housing 21 and the cap 22, respectively. In addition, an inner circumferential surface of each of the lower ball bearing 41 and the upper ball bearing 42 is fixed to the outer circumferential surface of the shaft 31. The bearing portion 4 is thus configured to rotatably support the shaft 31. Note that, although the bearing portion 4 according to the present preferred embodiment is defined by ball bearings, this is not essential to the present invention. The bearing portion 4 may alternatively be defined by a bearing mechanism of another type, such as, for example, a plain bearing or a fluid bearing.

Once the electric drive currents are supplied to the coils 233 through the circuit board 24, radial magnetic flux is generated around each of the teeth 52 of the stator core 231. Then, a circumferential torque is produced by interaction between the magnetic flux of the teeth 52 and magnetic flux of the rotor magnet 322, so that the rotating portion 3 is caused to rotate about the rotation axis 9 with respect to the stationary portion 2.

As described above, in the motor 1, the rotor core 321 is arranged around the shaft 31 to prevent a bending of the shaft 31. Moreover, since the first rotor holder 323 defines and functions as the back yoke, it is not necessary to extend the rotor core 321 up to the vicinity of the upper end portion of the rotor magnet 322. This contributes to improving the precision with which the circumferential position of the rotor magnet 322 is detected by the magnetic sensors 241 while reducing an increase in the weight of the motor 1.

While preferred embodiments of the present invention have been described above, it is to be understood that the present invention is not limited to the above-described preferred embodiments.

Figure 5:
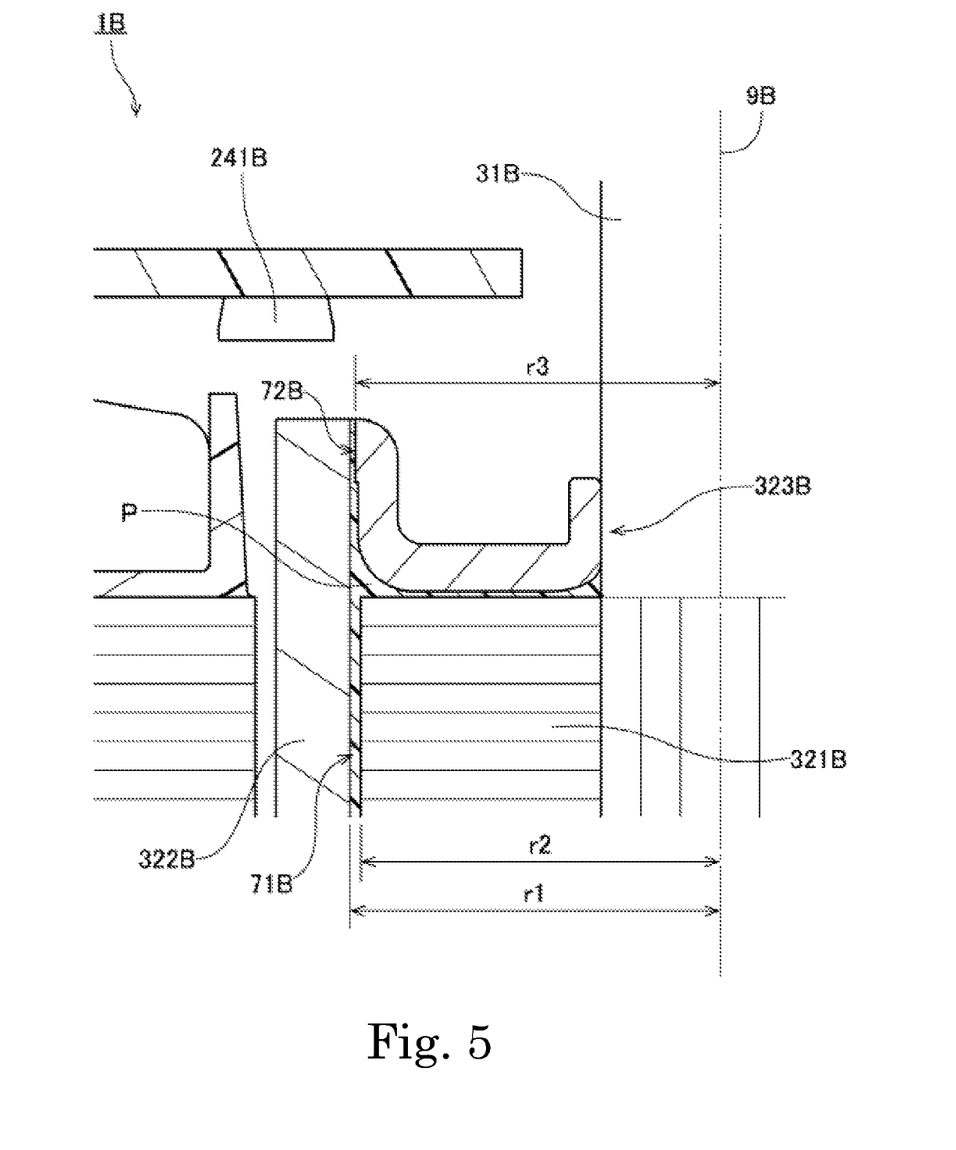
FIG. 5 is a partial cross-sectional view of a motor according to a modification of the second preferred embodiment of the present invention.

FIG. 5 is a partial cross-sectional view of a motor 1B according to a modification of the above-described preferred embodiment. In the modification illustrated in FIG. 5, a radial distance r2 from a rotation axis 9B to an outer circumferential surface of a rotor core 321B preferably is equal to or smaller than a radial distance r3 from the rotation axis 9B to an outer circumferential surface of a first rotor holder 323B.

Here, the radial width of a first gap 71B corresponds to a difference between a radial distance r1 from the rotation axis 9B to an inner circumferential surface of a rotor magnet 322B and the radial distance r2 from the rotation axis 9B to the outer circumferential surface of the rotor core 321B. Meanwhile, the radial width of a second gap 72B corresponds to a difference between the radial distance r1 from the rotation axis 9B to the inner circumferential surface of the rotor magnet 322B and the radial distance r3 from the rotation axis 9B to the outer circumferential surface of the first rotor holder 323B.

Thus, the radial width of the second gap 72B, which is a radial gap between the rotor magnet 322B and the first rotor holder 323B, preferably is equal to or smaller than the radial width of the first gap 71B, which is a radial gap between the rotor magnet 322B and the rotor core 321B.

When the radial width of the second gap 72B is reduced as in the modification illustrated in FIG. 5, a function of the first rotor holder 323B as a back yoke for a vicinity of an upper end portion of the rotor magnet 322B is improved.

This enables magnetic sensors 241B to detect the circumferential position of the rotor magnet 322B with higher precision.

Figure 6:
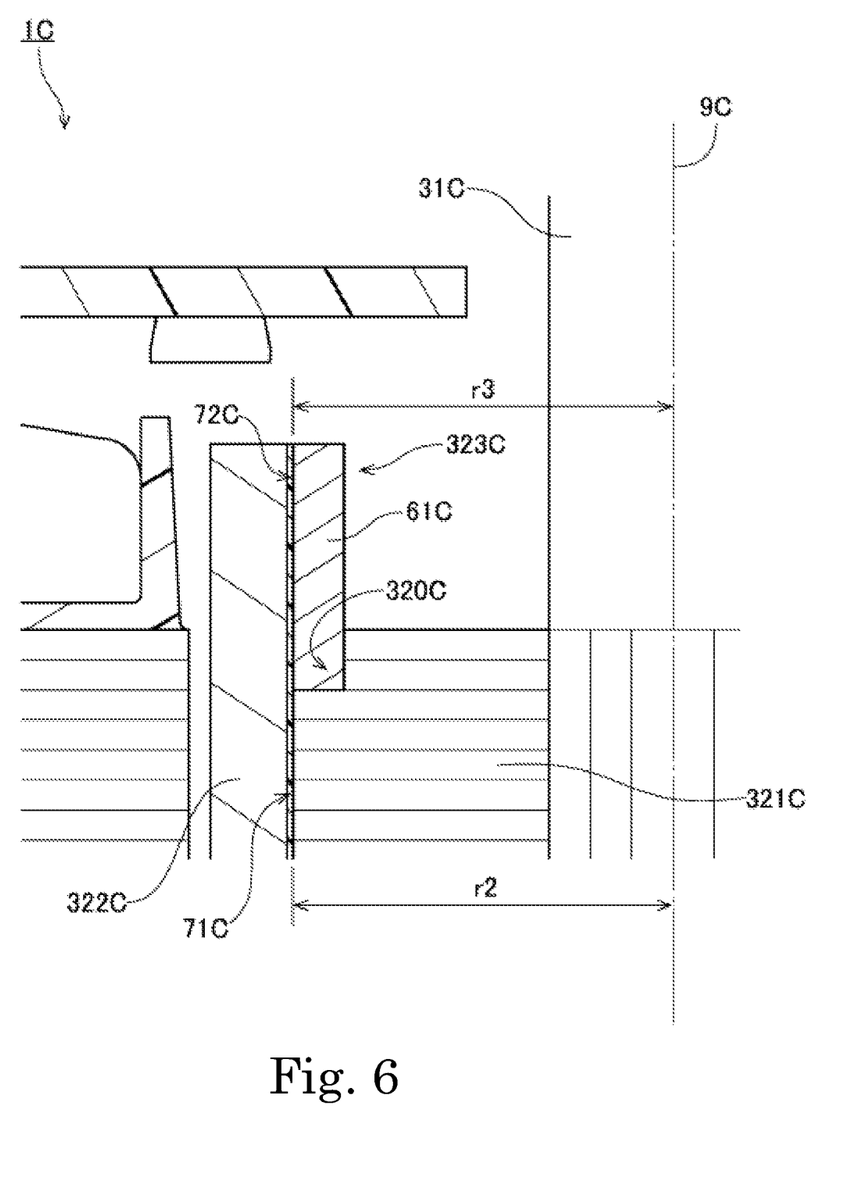
FIG. 6 is a partial cross-sectional view of a motor according to a modification of the second preferred embodiment of the present invention.

FIG. 6 is a partial cross-sectional view of a motor 1C according to another modification of the above-described preferred embodiment. In the modification illustrated in FIG. 6, a first rotor holder 323C is a cylindrical member extending along a rotation axis 9C. In other words, the first rotor holder 323C includes only an outer cylindrical portion 61C located opposite to a rotor magnet 322C with a second gap 72C intervening therebetween.

In addition, a rotor core 321C includes a recessed portion 320C recessed from each of an upper end surface and an outer circumferential surface of the rotor core 321C. An inner circumferential surface of a lower end portion of the first rotor holder 323C is press fitted to a radially inner surface of the recessed portion 320C, such that the first rotor holder 323C is fixed to the rotor core 321C.

In the modification illustrated in FIG. 6, it is easy to define the rotor core 321C and the first rotor holder 323C such that a radial distance r2 from the rotation axis 9C to the outer circumferential surface of the rotor core 321C and a radial distance r3 from the rotation axis 9C to an outer circumferential surface of the first rotor holder 323C are equal or substantially equal to each other.

When the radial distances r2 and r3 are equal or substantially equal to each other, the radial width of a first gap 71C, which is a radial gap between the rotor magnet 322C and the rotor core 321C, and the radial width of the second gap 72C, which is a radial gap between the rotor magnet 322C and the first rotor holder 323C, are equal or substantially equal to each other. Thus, a back yoke is arranged such that a gap between an outer circumferential surface of the back yoke and an inner circumferential surface of the rotor magnet 322C has a uniform or substantially uniform width from an axially upper end to an axially lower end thereof. This contributes to stabilizing magnetic flux passing from a surface of the rotor magnet 322C to a surrounding space.

Figure 7:
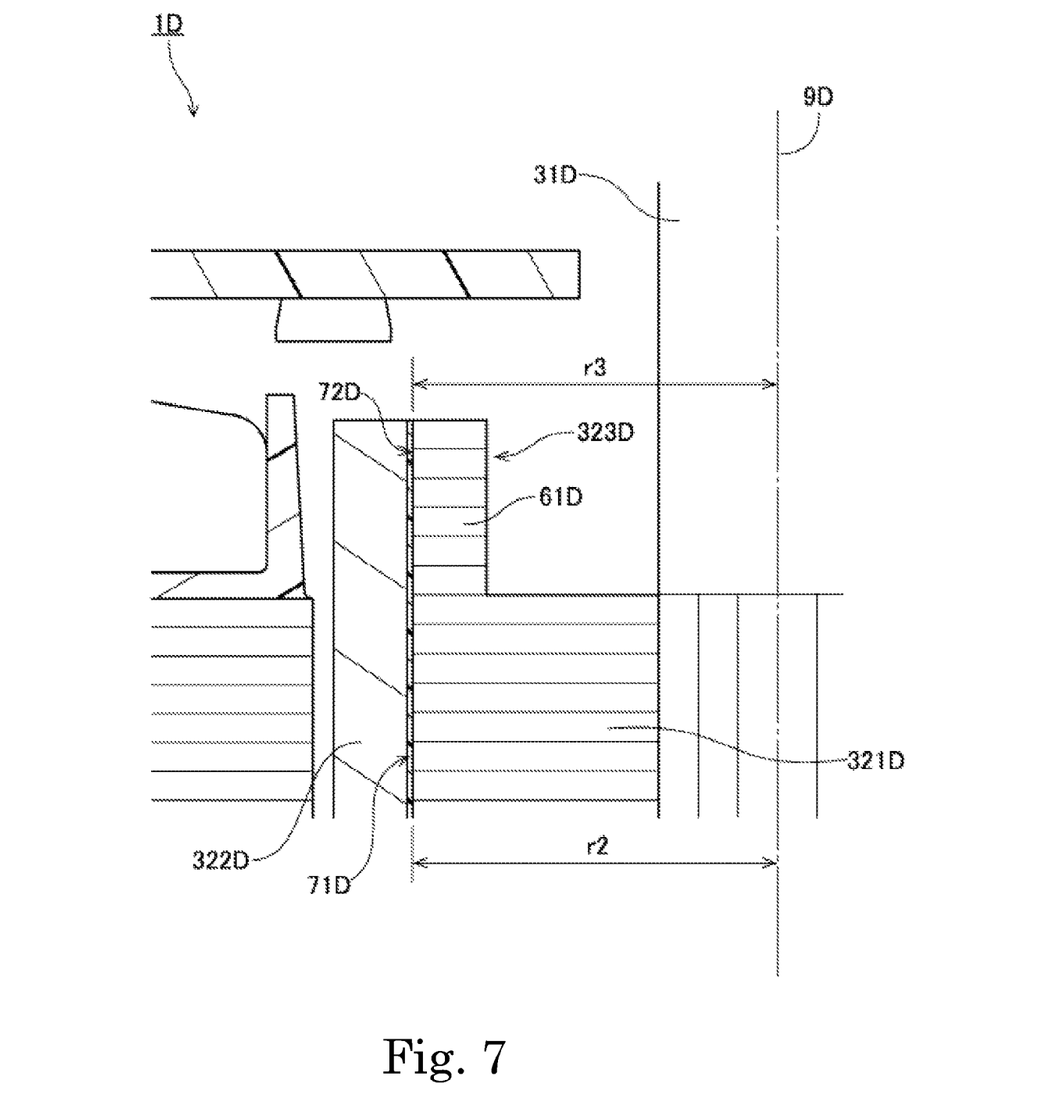
FIG. 7 is a partial cross-sectional view of a motor according to a modification of the second preferred embodiment of the present invention.

FIG. 7 is a partial cross-sectional view of a motor 1D according to another modification of the above-described preferred embodiment. In the modification illustrated in FIG. 7, a first rotor holder 323D is preferably defined by laminated steel sheets, just as a rotor core 321D is preferably defined by laminated steel sheets. The first rotor holder 323D includes only an outer cylindrical portion 61D located opposite to a rotor magnet 322D with a second gap 72D intervening therebetween.

The steel sheet positioned at a lower end of the first rotor holder 323D and the steel sheet positioned at an upper end of the rotor core 321D are preferably fixed to each other by, for example, crimping or the like, just as axially adjacent ones of the steel sheets within the rotor core 321D are fixed to each other by crimping or the like.

In the modification illustrated in FIG. 7, each of the steel sheets which define the rotor core 321D and each of the steel sheets which define the first rotor holder 323D are both molded by stamping. Accordingly, the rotor core 321D and the first rotor holder 323D are equivalent in radial dimensional accuracy. Therefore, it is easier to define the rotor core 321D and the first rotor holder 323D such that a radial distance r2 from a rotation axis 9D to an outer circumferential surface of the rotor core 321D and a radial distance r3 from the rotation axis 9D to an outer circumferential surface of the first rotor holder 323D are equal or substantially equal to each other than it is to define the rotor core 321C and the first rotor holder 323C such that the radial distance r2 from the rotation axis 9C to the outer circumferential surface of the rotor core 321C and the radial distance r3 from the rotation axis 9C to the outer circumferential surface of the first rotor holder 323C are equal or substantially equal to each other in the modification illustrated in FIG. 6.

When the radial distances r2 and r3 are more exactly equal to each other, the radial width of a first gap 71D, which is a radial gap between the rotor magnet 322D and the rotor core 321D, and the radial width of the second gap 72D, which is a radial gap between the rotor magnet 322D and the first rotor holder 323D, are more exactly equal to each other. Thus, a back yoke is configured such that a gap between an outer circumferential surface of the back yoke and an inner circumferential surface of the rotor magnet 322D has a uniform or substantially uniform width from an axially upper end to an axially lower end thereof. This contributes to further stabilizing magnetic flux passing from a surface of the rotor magnet 322D to a surrounding space.

Although the rotor holder is fixed to the shaft in the above-described preferred embodiment, this is not essential to the present invention. As in each of the modifications illustrated in FIGS. 6 and 7, the rotor holder may be fixed to the rotor core. Also note that the rotor holder and the rotor core may be fixed to each other by any other desirable fixing method, such as, for example, adhesion, welding, etc. For example, it may be so arranged that a raised portion and a recessed portion are defined in a lower end surface of the rotor holder and an upper end surface of the rotor core, respectively, and the raised portion and the recessed portion are mated and crimped together to fix the rotor holder and the rotor core to each other.

The motors according to the above-described preferred embodiments of the present invention are preferably used in a blower, for example. Note, however, that motors according to other preferred embodiments of the present invention may be used, for example, in office automation appliances, such as printers and copy machines, transportation equipment, such as automobiles, household electrical appliances, medical appliances, disk drives, blower fans, and the like to generate a variety of driving forces.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Preferred embodiments of the present invention are applicable to, for example, motors.

What is claimed is:

1. A motor comprising:
   a stationary portion; and
   a rotating portion configured to rotate about a rotation axis extends in a vertical direction; wherein
   the rotating portion includes:
      a shaft extending along the rotation axis; and
      a rotor configured to rotate together with the shaft;
   the stationary portion includes:
      a stator located radially outside of the rotor; and
      a magnetic sensor located above the rotor to detect a rotational position of the rotor;
   the rotor includes:
      a tubular rotor core including a ferromagnetic body and fixed to the shaft;
      a rotor magnet located radially outside of the rotor core and under the magnetic sensor, in contact with the rotor core or located opposite to the rotor core with a first gap intervening therebetween, and including an upper end surface located at an axial level higher than an axial level of an upper end surface of the rotor core; and at least one rotor holder including a ferromagnetic body, and located above the rotor core and radially inside of the rotor magnet, the rotor holder being defined by laminated steel sheets;

the rotor core is defined by laminated steel sheets placed one upon another in an axial direction; and the rotor holder includes an outer cylindrical portion in contact with the rotor magnet or located opposite to the rotor magnet with a second gap intervening therebetween.

2. The motor according to claim 1, wherein a radial width of a first gap between the rotor magnet and the rotor core and a radial width of a second gap between the rotor magnet and the first rotor holder are equal or substantially equal to one another.

* * * * *